United States Patent [19]

Jones

[11] Patent Number: 4,738,505
[45] Date of Patent: Apr. 19, 1988

[54] FIBER OPTIC CABLE TERMINATION

[75] Inventor: Theodore L. Jones, Lancaster, Pa.

[73] Assignee: RCA Corporate, Del.

[21] Appl. No.: 938,146

[22] Filed: Dec. 4, 1986

[51] Int. Cl.⁴ .................................................. G02B 6/42
[52] U.S. Cl. ................................ 350/96.20; 350/96.23
[58] Field of Search .............. 350/96.20, 96.21, 96.22, 350/96.23, 320; 156/85, 86, 293

[56] References Cited

U.S. PATENT DOCUMENTS

| 4,237,474 | 12/1980 | Ladany | 357/81 |
|---|---|---|---|
| 4,261,774 | 4/1981 | Lewis et al. | 156/86 |
| 4,284,449 | 8/1981 | Stone | 156/86 |
| 4,290,668 | 9/1981 | Ellis et al. | 350/96.20 |
| 4,319,802 | 3/1982 | Bowes | 350/96.20 |
| 4,390,237 | 6/1983 | Marazzi | 350/96.20 |
| 4,432,129 | 2/1984 | Featsent | 29/447 |
| 4,479,698 | 10/1984 | Landis et al. | 350/96.20 |
| 4,488,040 | 11/1984 | Rowe | 250/227 |
| 4,601,536 | 7/1986 | Guazzo | 350/96.2 |
| 4,603,942 | 8/1986 | Chang et al. | 350/96.23 X |
| 4,611,748 | 9/1986 | Winter et al. | 350/96.23 X |
| 4,640,725 | 2/1987 | Jones | 350/96.21 X |

FOREIGN PATENT DOCUMENTS

| 0006811 | 1/1982 | Japan | 350/96.2 |
|---|---|---|---|
| 0086508 | 5/1985 | Japan | 350/96.2 |

OTHER PUBLICATIONS

RCA Corporation Publication relating to injection laser modules.

AMP Corporation Publication relating to a fiber optic connector.

Primary Examiner—John Lee
Assistant Examiner—John Ngo
Attorney, Agent, or Firm—Raymond A. Eckersley

[57] ABSTRACT

A method is disclosed for making a termination between (a) a fiber optic cable having an optical fiber, a plurality of reinforcement strands positioned about the optical fiber, and a jacket positioned about the reinforcement strands; with (b) an electro-optic component housing having a tubular extension. In accordance with the method of this invention, in the initial step, a predetermined length of the outer jacket is removed from the fiber optic cable to expose a length of optical fiber and reinforcement strands. A rigid sleeve is then slideably placed onto the optical fiber until it extends a distance under the jacket and is retained thereby. The optical fiber is then hermetically sealed to the sleeve, suitably by solder introduced through one or more holes in the wall of the sleeve. The seal and the integrity of the fiber can be tested at this point, a decided advantage. The rigid sleeve is inserted into and through the tubular extension and sealed therein so that the optical fiber may be coupled to a device within the housing. A layer of adhesive is applied to the tubular extension and the exposed portion of the rigid sleeve. The reinforcement strands are positioned about the outer diameter surface of the tubular extension and a layer of protective material is bonded thereover. A preferred protective material is heat-shrink tubing.

11 Claims, 1 Drawing Sheet

FIBER OPTIC CABLE TERMINATION

The Government has rights in this invention pursuant to Contract No. F30602-83-C-0142 awarded by the Department of the Air Force.

This invention relates to a novel fiber optic cable termination and to the method of forming the termination. More particularly, this invention is concerned with a fiber optic cable termination for use in securing a fiber optic cable to an electro-optic component housing.

BACKGROUND OF THE INVENTION

Electro-optic systems comprised of optical fibers and electro-optic components are used in a wide variety of commercial applications, such as data-communications.

The optical fibers which are commonly employed have a relatively small diameter core comprised of an optically transparent material, e.g. glass or plastic, surrounded by a protective cladding layer of glass or a polymeric material. A glass optical fiber having a glass cladding layer may have an additional thin layer of a polymeric material to prevent microcracking. Since optical fibers are relatively weak, they are subject to breakage when strain is applied to them. Even if strain applied to an optical fiber within an electro-optic system does not break the optical fiber, it can force the terminal end thereof out of alignment with an electro-optic component, causing the system to become inutile. Optical fibers are conventionally protected by being encased in a fiber optic cable. The most commonly employed type of fiber optic cable has an optical fiber in the center, a plurality of reinforcement strands positioned circumferentially about the optical fiber and aligned with the length of the optical fiber so as to be capable of relieving strain on the optical fiber, and an outer jacket disposed over and about the reinforcement strands.

The electro-optic components of an electro-optic system include many different types of devices, such as light emitters, light detectors, signal repeaters and the like. Many of the electro-optic components are highly sensitive to environmental contaminants and are highly susceptible to physical damage. To prevent damage, the components are sealed in protective component housings which are made in various configurations to accommodate the different types of devices. All component housings include an opening for passage of an optical fiber to the interior.

When connecting a fiber optic cable into an electro-optic system, a terminal end of the optical fiber must be precisely aligned with the electro-optic component packaged in a component housing and secured in position. The component housing is then hermetically sealed and the remaining portions of the fiber optic cable, that is, the reinforcement strands and the jacket, are trimmed and secured to the component housing by mechanically crimping or by a length of heat-shrink tubing.

The securing of fiber optic cables to the component housings presents serious production and performance problems. In order for the fiber optic cable to protect the optical fiber from strain, the ends of the reinforcement strands must be locked in position so as to absorb any strain placed on the fiber optic cable. Certain of the suggestions heretofore made for fiber optic terminations required a relatively complex series of steps by a skilled operator to make an even marginally satisfactory termination. Other suggestions involved introducing another optical interface with special fittings similar to those used to couple lengths of fiber optic cable together, which couplings produced an excessively large connection. The most serious problem encountered with the suggested methods was that they did not provide adequate strain reief so as to prevent breakage and misalignment of the optical fibers with the components.

In a previous patent application, Ser. No. 785,790, filed Oct. 9, 1985, (now U.S. Pat. No. 4,640,725). I have disclosed a method of making a termination of a fiber optic cable of the above-described type with a component housing wherein a predetermined length of the outer jacket is removed from the cable, the optical fiber is inserted into and through a tubular extension of a component housing and retained in place. The reinforcement strands of the cable are then separated into at least two groups, and positioned to partially cover the tubular extension. A layer of adhesive and a cover of, e.g. heat-shrink tubing, are then applied to cover the tubular extension and fiber cable. In accordance with this invention, an improvement is provided in the method of my prior application which facilitates reliable assembly and substantially strengthens the termination.

SUMMARY OF THE INVENTION

A method is disclosed for making a termination between (a) a fiber optic cable of the type having a centrally positioned optical fiber, a plurality of reinforcement strands positioned about the optical fiber, and a jacket positioned about the reinforcement strands, and (b) an electro-optic component housing having a tubular extension. In accordance with this invention, a portion of the jacket is removed from the fiber optic cable to expose a length of optical fiber and lengths of the reinforcement strands. The optical fiber is then inserted into and through a rigid sleeve which extends for a distance between the optical fiber and the reinforcement strands such that it partially underlies the jacket. The optical fiber is hermetically sealed into the rigid sleeve, preferably by solder through openings provided near the end thereof which is opposite to that retained under the cable jacket. The rigid sleeve is then inserted into and through the tubular extension to a predetermined position within the component housing and preferably fixed in place. A layer of adhesive is applied to the outer surface of the exposed portion of the tubular extension and the reinforcement strands are then positioned there around. Alternatively, the reinforcement strands may be placed on the outer surface of the tubular extension in groups of two or more and the adhesive applied thereover. The reinforcement strands and an end portion of the jacket are covered with a protective coating. A preferred coating is adhesive-lined heat-shrink tubing which is positioned over the areas indicated and heated to shrink and securely retain the assembly.

DETAILED DESCRIPTION OF THE INVENTION

Figure 1:
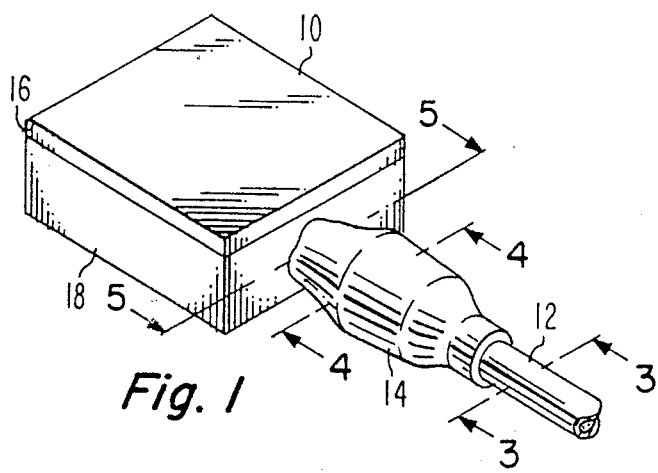
FIG. 1 is an isometric pictorial illustration of an electro-optic component housing secured to a fiber optic cable termination of this invention.

In FIG. 1 there is illustrated a sealed electro-optic component housing 10 secured to a fiber optic cable 12 with the fiber optic cable termination 14 of this invention.

The sealed electro-optic component housing 10 shown in FIG. 1 has a lid 16 sealed to the component container 18 and includes a tubular extension which is hidden from view by the fiber optic cable termination 14.

Figure 2:
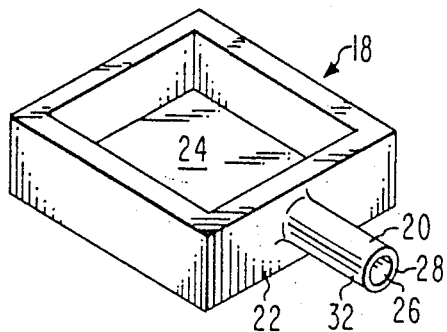
FIG. 2 is an illustration of a typical optic component housing of the type utilized in the present invention.

In FIG. 2, the electro-optic component container 18 is shown separate from the other elements of the structure of FIG. 1. As can best be seen from FIG. 2, the electro-optic component container 18 has a main body 22 having an interior compartment 24 for receiving an electro-optic device (not shown) and a tubular extension 20 projecting away from the main body 22. The main body 22, as illustrated, is box-like in configuration, but can be of any other configuration as required by the shape of the electro-optic device to be encased in the component container 18. The tubular extension 20 is preferably formed as an integral part of the component container 18 in order to facilitate hermetic sealing of the component housing 10. The tubular extension 20 projects a predetermined distance outwardly from the main body 22, which distance is sufficient to receive and support a rigid sleeve and permit a strong adhesive bond to be made between the sleeve and the tubular extension 20 as will be explained in greater detail below. The tubular extension 20 has a passage 26 which extends from the distal end 28 to the interior compartment 24 of the component housing 10. The diameter of the passage 26 of the tubular extension 20 is slightly larger than the diameter of the rigid sleeve. The outer surface 32 of the tubular extension 20 can be smooth, but preferably is somewhat roughened in order to provide a surface with improved gripping properties.

Figure 3:
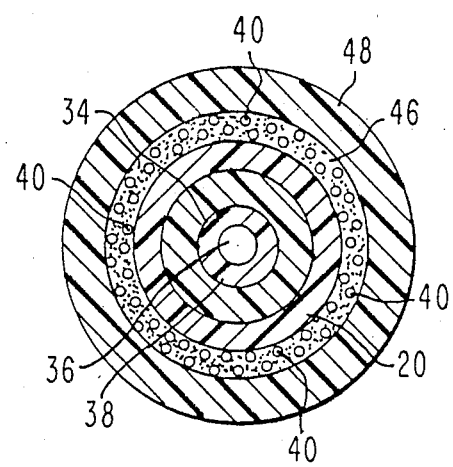
FIG. 3 is a cross-sectional illustration of a fiber optic cable taken as indicated by the lines and arrows 3—3 in FIG. 1.

The fiber optic cable 12 which is employed in this invention is of conventional construction of the type generally described above. As shown best in FIG. 3, the fiber optic cable 12 has an optical fiber 34 in the center thereof which consists of a core 36 made of glass, a transparent plastic, or another transparent material, and one or more cladding and/or buffer layers 38 formed about the outer surface of the core 36. Although a plurality of cladding and/or buffer layers may surround the optical fiber 34, only a single layer 38 is illustrated in the FIGURES. Surrounding the optical fiber 34 is a plurality of reinforcement strands 40 which are made of relatively flexible, strong synthetic material, such as Kevlar (aramid fiber) sold by E. I. DuPont deNemours and Company. A compliant jacket 42, made of a resin such as tetrafluoroethylene resin or nylon, is disposed about the reinforcement strands 40 of the fiber optic cable 12.

Figure 6:
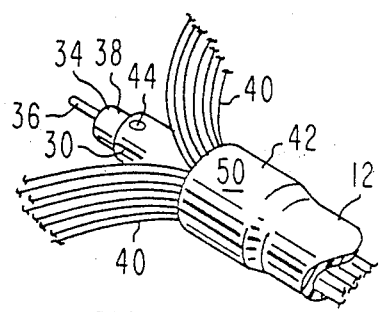
FIG. 6 is an illustration of a fiber optic cable having a terminal end portion of the jacket removed and the rigid sleeve inserted over the optical fiber to extend between the fiber and the reinforcement strands partially under the jacket. The reinforcement strands have been separated into groupings.

The initial step in the formation of the fiber optic cable termination 14 of this invention is to remove a predetermined length of the jacket 42 from a terminal end of the fiber optic cable 12 as shown in FIG. 6. The removal of a portion of the jacket 42 will cause the reinforcement strands 40 and the optical fiber 34 to be exposed. The length of the portion of the jacket 42 to be removed should be somewhat longer than the length of the tubular extension 20 of the component housing 18 so as to expose a sufficient length of the optical fiber 34 to facilitate proper alignment thereof with the electro-optic device (not shown) packaged in the component housing 18.

In accordance with this invention, after removal of a portion of the jacket 42 of the fiber optic cable 12, a rigid sleeve 30 is slideably placed over the optical fiber 34 and extended between the cladding layer 38 and the reinforcement strands 40 for a distance under the jacket 42 as shown in FIG. 6. The rigid sleeve 30 has an inside diameter slightly larger than the outside diameter of the cladding layer 38 of the optic fiber 34. The outside diameter of the rigid sleeve 30 is slightly smaller than the diameter of the passage 26 in the tubular extension 20 of the component housing 18. In addition, the outside diameter of the rigid sleeve 30 is such that it can be made to fit snugly under the reinforcement strands 40 and the jacket 42 and be securely retained thereby. The retention of the rigid sleeve 30 by the jacket 42 considerably strengthens the termination of this invention in the area just outside of the tubular extension 20 where, heretofore, the optic fiber 34 has been shown to be fragile, particularly during handling as a subassembly.

The length of the rigid sleeve 30 is at least equal to the distance that it extends under the jacket 42 plus the length of the tubular extension 20. In addition, the rigid sleeve 30 has at least one opening 44 in the wall thereof at the end opposite to the jacket 42.

After the rigid sleeve 30 has been slideably inserted over the optical fiber 34 and partially under the reinforcement strands 40 and the jacket 42 so that it is held securely thereby, the optical fiber 34 is hermetically sealed at the opposite end. When the cladding layer 38 is glass, the seal may be formed by introducing solder into the rigid sleeve 30 through the opening 44 in the end of the rigid sleeve 30 opposite to the jacket 42. The hermetic seal formed between the optical fiber 34 and the rigid sleeve 30 provides mechanical support for the optical fiber 34 so that it need only be exposed and bonded at one location. Multiple bonding has been shown to induce stress on the fiber as a result of differential expansion of the assembly. The advantage of the subject termination is evident when it is considered that such thermal cycling frequently causes fracture of the optical fiber. The use of the rigid sleeve 30 in forming the termination of this invention is further advantageous in that the optical fiber 34 can be tested to determine whether it has been damaged and whether the hermetic seal is intact before it is placed into the component housing 10.

After the testing is completed, the rigid sleeve 30 is inserted into the distal end 28 and through the passage 26 of the tubular extension 20 and preferably substantially into the interior compartment 24 of the component housing 18. The terminal end of the optical fiber 34 is then placed in alignment with an electro-optic device (not shown). Thereafter, the optical fiber 34 is fixed in place by known methods, such as those described in Ladany, U.S. Pat. No. 4,237,474 and Landis et al., U.S. Pat. No. 4,479,698. The use of the rigid sleeve is advantageous in this operation as it allows for manipulations to be made without reaching into the interior 24 of the housing 10, thus simplying fixturing and making more compact designs possible. A final hermetic seal is then formed between the rigid sleeve 30 and the walls of the passage 28 by conventional means, such as solder or an adhesive.

An adhesive layer 46 is then applied to the outer surface 32 of the tubular extension 20 and to the exposed portion, if any, of the rigid sleeve 30. The adhesive layer 46 can be applied in liquid form, tape form or the like. Commercially available heat-activatable adhesive tubing is particularly suitable. Such tubing will be applied only to the tubular extension 20 and rigid sleeve 30. If the adhesive is in another form, e.g. a liquid, it may also be applied to an end portion 50 of the jacket 42 remaining on the fiber optic cable 12. The exposed reinforcement strands are positioned over the adhesive layer 46 so that they are arranged around the tubular extension 20. Alternatively, the reinforcement strands 40 are separated into a plurality of groups as illustrated in FIG. 6. The groups of strands are positioned at approximately even intervals around the outer surface 32 of the tubular extension 20. A layer of adhesive 46 is then applied to the groups of strands and the exposed surfaces of the tubular extension 20, the rigid sleeve 30 and a portion 50 of the jacket 42 remaining on the fiber optic cable 12. The adhesive can be applied in any conventional form, e.g. a liquid, paste, tape or tubing.

Figure 5:
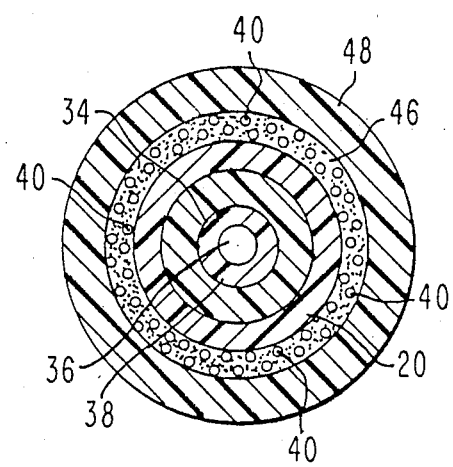
FIG. 5 is a cross-sectional illustration of the completed fiber optic cable termination taken as indicated by the lines and arrows 5—5 in FIG. 1.

A layer of protective material 48 is then applied to the termination and sealed in place. Although any conventional protective coating material may be utilized, it is preferred to utilize heat-shrink tubing which, as it contracts, will force adhesive into and around the reinforcement strands 40 as shown in FIG. 5. If a conventional adhesive-lined heat-shrink tubing is utilized, the separate application of an adhesive is unnecessary and may be omitted. In FIG. 5, the support for the optical fiber 34 as it enters the component housing 10 is readily appreciated. The optical fiber 34 is surrounded by the rigid sleeve 30 and the tubular extension 20 which is in turn supported by the reinforcement strands 40 which are secured in place by the adhesive 46 and the protective coating 48.

Figure 4:
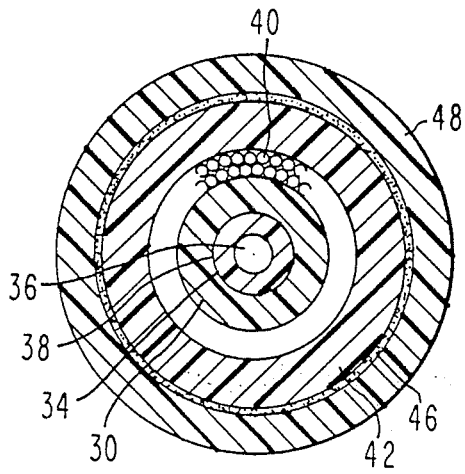
FIG. 4 is a cross-sectional illustration of the fiber optic cable reinforced at a point of frequent damage by the insertion of the sleeve between the cladding and the reinforcement stands so that it extends into the jacket, taken as indicated by the lines and arrows 4—4 in FIG. 1.

In FIG. 4, it is evident that the subject termination provides support at the point on the optical fiber 34, just outside of the tubular extension 20. As previously stated, this area has been demonstrated to be prone to damage. The optical fiber 34 is supported by the rigid sleeve 30, the reinforcement strands 40, the jacket 42, the adhesive 46 and the protective coating 48. This strength is a particular advantage of the termination of this invention.

The invention has been described with reference to preferred embodiments thereof. It will be appreciated by those skilled in the art that various modifications may be made from the specific details given without departing from the spirit and scope of the invention.

What is claimed is:

1. A method for forming a termination of a fiber optic cable with an electro-optic component housing wherein the fiber optic cable is comprised of an optical fiber, a plurality of reinforcement strands aligned about the length of the optical fiber, and a jacket positioned about the reinforcement strands, and the electro-optic component housing has an interior compartment, a tubular extension of a predetermined length with a passage in communication with the interior compartment, and an outer diameter surface, said method comprising the steps of:
(a) removing a terminal portion of the jacket which is at least as long as the predetermined length of the tubular extension, thereby exposing a length of optical fiber and lengths of reinforcement strands at one end of the jacket on the fiber optic cable;
(b) slideably inserting a rigid sleeve over the optical fiber and under the reinforcement strands for a distance such that the sleeve extends under the jacket and is retained thereby, said rigid sleeve being at least as long as the distance it extends under the jacket plus the predetermined length of the tubular extension and having at least one opening in the wall thereof at the end opposite to the jacket;
(c) hermetically sealing the optical fiber into the rigid sleeve;
(d) inserting the exposed length of the rigid sleeve into and through the passage to the interior compartment of the component housing;
(e) bonding said sleeve to the tubular extension;
(f) providing a layer of adhesive over the tubular extension, and the exposed portion of the rigid sleeve;
(g) positioning the exposed reinforcement strands about the outer diameter surface of the tubular extension; and
(h) providing a layer of protective material over the exposed reinforcement strands and an end portion of the jacket.

2. A method in accordance with claim 1, wherein the optical fiber is sealed into the rigid sleeve by introducing solder into the sleeve through said opening.

3. A method in accordance with claim 1, wherein the layer of adhesive is adhesive tubing.

4. A method in accordance with claim 1, wherein the reinforcement strands are positioned about the outer diameter surface of the tubular extension and the adhesive is applied thereover.

5. A method in accordance with claim 4, wherein the exposed lengths of reinforcement strands are divided into at least two groups of about equal size which are spaced at about equal distances on the outer diameter surface of the tubular extension.

6. A method in accordance with claim 1, wherein the layer of protective material is heat-shrink tubing.

7. A method in accordance with claim 6, wherein the layer of adhesive is provided on the inside surface of the heat-shrink tubing and steps (f) and (h) are carried out simultaneously after step (g).

8. A method in accordance with claim 1, additionally including the steps of testing the optical fiber after it has been sealed into the sleeve to determine if it is hermetically sealed and the fiber is intact prior to inserting the sleeve into the tubular extension.

9. A termination of a fiber optic cable with an electro-optic component housing wherein the fiber optic cable includes an optical fiber and a plurality of reinforcement strands aligned about the length of the optical fiber and a jacket positioned about the reinforcement strands except at a terminal end wherein a portion of the jacket of at least a predetermined length is removed to provide an unjacketed length of the optical fiber and unjacketed lengths of reinforcement strands; and the electro-optic component housing has an interior compartment and a tubular extension of said predetermined length having an internal passage in communication with the interior of the component housing and an outer diameter surface, said termination being comprised of the unjacketed length of fiber hermetically sealed within a length of rigid sleeve which is positioned within the tubular extension and extends from at least the interior compartment of the component housing to a point a predetermined distance within the jacket and underlying said reinforcement strands, the unjacketed reinforcement strands being positioned about the outer diameter of the tubular extension and bonded thereto by a layer of adhesive and a layer of protective material overlying and bonded to the tubular extension and a portion of the jacket of the fiber optic cable.

10. A termination in accordance with claim 9, wherein the layer of protective material is a length of shrink-fit tubing which is in shrink-fit and adhesive engagement with the reinforcement strands and the jacket.

11. A termination in accordance with claim 9, wherein the layer of adhesive is a length of adhesive tubing.

* * * * *

UNITED STATES PATENT AND TRADEMARK OFFICE
CERTIFICATE OF CORRECTION

PATENT NO. : 4,738,505
DATED : April 19, 1988
INVENTOR(S) : Theodore L. Jones

It is certified that error appears in the above-identified patent and that said Letters Patent is hereby corrected as shown below:

On The Title Page

The name of the assignee should be corrected to read:

-- RCA Corporation --.

Signed and Sealed this

Tenth Day of October, 1989

*Attest:*

DONALD J. QUIGG

*Attesting Officer*　　　*Commissioner of Patents and Trademarks*